(12) United States Patent
An et al.

(10) Patent No.: US 10,767,698 B2
(45) Date of Patent: Sep. 8, 2020

(54) BEARING CAGE AND USE THEREOF (71) Applicant: Aktiebolaget SKF, Gothenburg (SE)

(72) Inventors: Hongyuan An, Shanghai (CN); Yvonne Yang, Shanghai (CN)

( * ) Notice: Subject to any disclaimer, the term of this patent is extended or adjusted under 35 U.S.C. 154(b) by 0 days.

(21) Appl. No.: 16/456,901

(22) Filed: Jun. 28, 2019

(65) Prior Publication Data

US 2020/0018351 A1    Jan. 16, 2020

(30) Foreign Application Priority Data

Jul. 12, 2018 (CN) .......................... 2018 1 0763824

(51) Int. Cl.
*F16C 33/41* (2006.01)
(52) U.S. Cl.
CPC .......... *F16C 33/412* (2013.01); *F16C 33/418* (2013.01)
(58) Field of Classification Search
CPC .... F16C 33/412; F16C 33/424; F16C 33/416; F16C 33/418
See application file for complete search history.

(56) References Cited

U.S. PATENT DOCUMENTS

| 6,540,405 | B2* | 4/2003 | Kobayashi | F16O 19/166 384/450 |
| 6,843,604 | B2* | 1/2005 | Hiramatsu | F16O 19/163 384/450 |
| 2002/0006238 | A1* | 1/2002 | Kobayashi | F16O 33/418 384/523 |
| 2007/0297705 | A1* | 12/2007 | Hosoya | F16O 33/3818 384/462 |

FOREIGN PATENT DOCUMENTS

JP        2005083406 A  *  3/2005  ............ F16C 33/416

* cited by examiner

*Primary Examiner* — Phillip A Johnson
(74) *Attorney, Agent, or Firm* — Reed Smith LLP (57) ABSTRACT

A one-way snap-in cage for a deep groove ball bearing having an annular backbone portion and a hanging out portion extending from the backbone portion towards an axial side. The hanging out portion including a pocket for accommodating a rolling element of a bearing in a circumferential direction and a pocket connection used to connect adjacent pockets. A bottom portion of the pocket is formed integrally with the backbone portion. The ratio $H_c/D_w$ of a radial size $H_c$ of the cage in terms of thickness to the diameter $D_w$ of the rolling element of the bearing satisfies the relation $17.679\% \leq H_c/D_w \leq 37.389\%$, the radial size $H_c$ of the cage is equal in value to half of the difference between the maximum outer diameter $D_{c\_max}$ and the minimum inner diameter $D_{c\_min}$ of the cage. The present invention further provides a deep groove ball bearing using the cage.

21 Claims, 11 Drawing Sheets

BEARING CAGE AND USE THEREOF

CROSS-REFERENCE TO RELATED APPLICATIONS

This application claims priority to Chinese patent application no. 201810763824.2 filed on Jul. 12, 2018, the contents of which are fully incorporated herein by reference.

FIELD OF THE INVENTION

The present invention relates to a one-way snap-in cage, and a deep groove ball bearing using such a cage.

BACKGROUND OF THE INVENTION

A deep groove ball bearing has the performance qualities of a low frictional torque and a high rotational speed and is therefore widely applied in practice. A one-way snap-in cage has low costs and is convenient to install and has thus become a conventional configuration for a deep groove ball bearing. As shown in FIGS. 1 and 2, a typical one-way snap-in cage 1 is axially divided into an approximately annular backbone portion 10 and a hanging out portion 20 extending from the backbone portion 10 towards an axial side. The hanging out portion 20 comprises a pocket 21 for accommodating a rolling element of a bearing (not shown) in a circumferential direction and a pocket connection 22 connecting adjacent pockets. As shown in FIGS. 1d, 1e, 2d, and 2e, a bottom portion 23 of the pocket 21 is formed integrally with the backbone portion 10. In other words, at a position corresponding to the bottom portion 23 of the pocket, the backbone portion 10 is at least partially integrated in the structural material of the bottom portion 23 of the pocket. At other positions (other than the bottom portion 23 of the pocket) in the circumferential direction, the backbone portion 10 extends in an axial direction to form the pocket connection 22.

The inherent disadvantages of a snap-in cage are that, as the rotational speed increases, a hanging out portion extends outwards under the effect of a centrifugal force and has an increased diameter, resulting in a so-called umbrella effect. The umbrella effect damages a matching relationship between a pocket and a rolling element, causing increasingly intense friction between the pocket and the rolling element, and, in a severe case, the cage may fall off from the rolling element. Another adverse result of the umbrella effect is that the stress accumulates at the bottom portion of the pocket and the material here is likely to fracture. To resolve the problem, in the prior art, the radial size of the cage in terms of thickness is usually increased to mitigate the umbrella effect.

In a typical solution, as shown in FIG. 1, the cage 1 generally uses a double-layer structure, and both the backbone portion 10 and the hanging out portion 20 of the cage are of a double-layer structure. In another solution, as shown in FIG. 2, the backbone portion 10 uses a double-layer structure, but the hanging out portion 20 only uses a single-layer structure. In the foregoing two design concepts, the overall structural strength of the cage and the partial structural strength of the backbone portion are respectively increased to mitigate the umbrella effect. However, in fact, the two solutions have a limited effect on improving the adaptability of the cage to a high rotational speed and cannot satisfy urgent technical requirements for cages and bearings with a higher rotational speed. The market requires a cage that can adapt to a higher rotational speed and a deep groove ball bearing using such a cage.

BRIEF SUMMARY OF THE INVENTION

To resolve the technical problem, the present invention provides a one-way snap-in bearing cage that can adapt to a higher rotational speed. In one embodiment, the ratio $H_c/D_w$ of a radial size $H_c$ of the cage in terms of thickness to the diameter $D_w$ of the rolling element of a bearing satisfies the relation $17.679\% \leq H_c/D_w \leq 37.389\%$. The radial size $H_c$ of the cage is defined as half of the difference between the maximum outer diameter $D_{c\_max}$ and the minimum inner diameter $D_{c\_min}$ of the cage, that is, $H_c = (D_{c\_max} - D_{c\_min})/2$. The same technical solution may also be expressed as follows: the ratio $H_c/H$ of the radial size $H_c$ of the cage in terms of thickness to a radial size $H$ of the bearing in terms of thickness satisfies the relation $11.625\% \leq H_c/H \leq 23.000\%$. The radial size $H$ of the bearing in terms of thickness is defined as half of the difference between an outer diameter $D$ and an inner diameter $d$ of the bearing, that is, $H = (D-d)/2$.

In another embodiment, the maximum outer diameter $D_{c\_max}$ of the cage and a pitch diameter $D_p$ of the bearing satisfy the relation $-16.256\% \leq (D_{c\_max} - D_p)/D_w \leq 24.384\%$. The pitch diameter $D_p$ of the bearing is defined as half of the sum of an outer diameter $D$ and an inner diameter $d$ of the bearing, that is, $D_p = (D+d)/2$. The same technical solution may also be expressed as follows: the maximum outer diameter $D_{c\_max}$ of the cage and the pitch diameter $D_p$ of the bearing satisfy the relation $-2.5\% \leq (D_{c\_max} - D_p)/H \leq 5\%$. H is the previously defined radial size of the bearing in terms of thickness.

The preceding two embodiments are different technical solutions of the same inventive concept, and the structural size of the cage is limited in different dimensions to reduce the mass of the cage, so that the mechanism of an umbrella effect is reduced by reducing the mass.

The present invention further provides a deep groove ball bearing using the cage. Apparently, such a deep groove ball bearing can adapt to an application working condition with a higher rotational speed and have a significantly reduced temperature rise effect at the same rotational speed, so that there are huge advantages in terms of rotational speed and excellent application prospects.

Various embodiments and beneficial effects of the present invention are described below in detail with reference to the accompanying drawings.

BRIEF DESCRIPTION OF THE SEVERAL VIEWS OF THE DRAWING

FIG. 1b is a schematic sectional view along A-A in FIG. 1a;

FIG. 1c is a schematic sectional view along B-B in FIG. 1a;

FIG. 2b is a schematic sectional view along A-A in FIG. 2a;

FIG. 2c is a schematic sectional view along B-B in FIG. 2a;

FIG. 3b is a schematic sectional view along A-A in FIG. 3a;

FIG. 3c is a schematic sectional view along B-B in FIG. 3a;

FIG. 4b is a schematic sectional view along A-A in FIG. 4a;

FIG. 4c is a schematic sectional view along B-B in FIG. 4a;

FIG. 5b is a schematic sectional view along A-A in FIG. 5a;

FIG. 5c is a schematic sectional view along B-B in FIG. 5a;

FIG. 6b is a schematic sectional view along A-A in FIG. 6a;

FIG. 6c is a schematic sectional view along B-B in FIG. 6a;

FIG. 7b is a schematic sectional view along A-A in FIG. 7a;

FIG. 7c is a schematic sectional view along B-B in FIG. 7a;

DETAILED DESCRIPTION OF THE INVENTION

For ease of description, in the accompanying drawings, a direction shown by an axis (a dot dash line) of a bearing is defined as an "axial direction", a direction perpendicular to the axis is defined as a "radial direction", and a virtual plane containing the axis is defined as an "axial section" of the bearing. In addition, unless otherwise indicated, all radial sizes herein are radial sizes of specific annular members in terms of thickness rather than radial sizes in terms of the diameters of the annular members. Various embodiments of the present invention are described below in detail with reference to the accompanying drawings. The same or similar parts have the same reference numerals.

The present invention has been made based on the knowledge of the umbrella effect of a one-way plug-in cage that differs from the prior art understanding. The inventor believes that the umbrella effect is generally dependent on the mass and stiffness of the cage, but it is not wise to increase the mass of the cage in order to increase its rigidity.

It can be easily understood that, during rotation, a centrifugal force that the cage bears comes from the mass of the cage and is directly correlated to the distribution (radius of gyration) of the mass in the radial direction. Therefore, the key to effective suppression of the umbrella effect is to reduce the mass of the cage and reduce the radius of gyration (the centrifugal force is directly proportional to the radius of gyration) of the cage. Generally, the radial size of the cage in terms of thickness is directly correlated to the mass of the cage.

Therefore, the mass of the cage can be generally reduced by reducing the radial size of the cage in terms of thickness.

In another aspect, the stiffness of a one-way snap-in cage depends on a backbone portion of the cage. The stiffness of the backbone portion of the annular structure depends on an empirical formula $S=EI/D_m^3$. S is the stiffness of an annular part. E is the elasticity modulus of the material. I is an area moment of inertia of the annular part. When the annular part has a rectangular section, $I=bt^3/12$, where b is the (axial) width of the annular part, and t is the (radial) wall thickness of the annular part. $D_m$ is the medium diameter of the annular part and is equal in value to half of the sum of the inner diameter and the outer diameter of the annular part, that is, $D_m=(D+d)/2$. As can be seen from the preceding formula, if other conditions are kept the same, $S \propto t^3$, that is, the stiffness of the backbone portion is directly proportional to the third power of the wall thickness of the backbone portion. This means that, for a backbone portion with a single-layer structure, the stiffness of the backbone portion can be effectively increased by increasing the wall thickness of the backbone portion.

Moreover, an annular part having a single layer structure has an advantage that the double layer part does not have in rigidity characteristics. Let's assume there is a backbone portion (not shown) having a single-layer structure, a radial size $H_b$ in terms of thickness (equal to the wall thickness in the simplest case) of which is 1.5 times the single-layer wall thickness t of the double-layer backbone portion 10 shown in FIGS. 1 and 2, that is, Hb=1.5t. Then, $H_b^3=(1.5t)^3=3.375t^3$, significantly greater than the algebraic sum of the cubes of the single-layer wall thicknesses in the double-layer backbone portion, which is, $t^3+t^3=2t^3$. The above assumption proves that, without considering that the double-layer structure has an effect of improving the overall rigidity of the backbone portion due to the correlation factor, a sufficiently thick single-layer structure is more advantageous for improving the rigidity of the backbone portion than a double-layer structure having a relatively thin wall thickness. Even if the thickness of the single-layer structure is less than the sum of thicknesses of the double-layer structure, for example, when $H_b<2t$, it is still possible to provide a cage with reduced mass but improved stiffness. It can be seen that the cage in the prior art which adopts a double-layer structure (including the case of a double-layered backbone) is unscientific in the design concept. In the views of the inventor, it is uneconomical to increase the strength of a double-layer structure by increasing the mass of the double-layer structure. This theoretically proves why existing double-layer cages (including the case of double-layer backbone portions) are difficult to adapt to higher rotational speeds. The present invention has been made on the basis of correcting the technical bias in the field of bearings for increasing the rigidity of the cage while ignoring the increase in its mass.

FIG. 3 shows a first embodiment of the present invention. It can be seen by comparing FIGS. 3d, 3e, 1d, 1e, 2d, and 2e that a radial size $H_c$ of the cage in terms of thickness in the present invention is obviously less than the similar sizes of the cage in the prior art. Herein, the radial size $H_c$ of the cage is equal in value to half of the difference between the maximum outer diameter $D_{c\_max}$ and the minimum inner diameter $D_{c\_min}$ of the cage, that is, $H_c=(D_{c\_max}-D_{c\_min})/2$. As discussed above, the reduced radial size can reduce the overall mass of the cage.

Specifically, the present invention requires that the radial size $H_c$ of the cage be only equal to 17.679% to 37.389% of the diameter $D_w$ of a rolling element of a bearing. Mathematically, the ratio $H_c/D_w$ of the radial size $H_c$ of the cage in the present invention to the diameter $D_w$ of the rolling element of the bearing satisfies the relation $17.679\% \leq H_c/D_w \leq 37.389\%$. In a further preferred embodiment, the ratio $H_c/D_w$ of the radial size $H_c$ of the cage in the present invention to the diameter $D_w$ of the rolling element of the bearing further satisfies the relation $19.711\% \leq H_c/D_w \leq 33.325\%$. In yet a further preferred embodiment, the ratio $H_c/D_w$ of the radial size $H_c$ of the cage in the present invention to the diameter $D_w$ of the rolling element of the bearing satisfies the relation $20.523\% \leq H_c/D_w \leq 31.293\%$.

In the preceding definition of the range of the radial size $H_c$ of the cage, the diameter $D_w$ of the rolling element of the bearing is used as a comparison basis (denominator). Optionally, a radial size H of the bearing may be used as a reference for defining the radial size $H_c$ of the cage. Herein, the radial size H of the bearing is the radial size of the bearing in terms of thickness, and is equal in value to half of the difference between an outer diameter D and an inner diameter d of the bearing, that is, $H=(D-d)/2$. In this case, the present invention requires that the radial size $H_c$ of the cage be equal to 10.875% to 23% of the radial size H of the bearing. Mathematically, the ratio $H_c/H$ of the radial size $H_c$ of the cage in the present invention to the radial size H of the bearing satisfies the relation $10.875\% \leq H_c/H \leq 23\%$. In a further preferred embodiment, the ratio $H_c/H$ of the radial size $H_c$ of the cage in the present invention to the radial size H of the bearing further satisfies the relation $12.25\% \leq H_c/H \leq 20.5\%$. In yet a further preferred embodiment, the ratio $H_c/H$ of the radial size $H_c$ of the cage in the present invention to the radial size H of the bearing satisfies the relation $16.125\% \leq H_c/H \leq 19.125\%$.

It can be easily understood that the preceding two limitation manners are consistent in the intention of determining the range of the radial size $H_c$ of the cage. However, because bearing series have a large size range span, a parameter that changes approximately proportionally with the radial size $H_c$ of the cage needs to be used as a comparison basis (denominator). In this aspect, the diameter $D_w$ of the rolling element and the radial size H of the bearing both satisfy the requirement and are therefore chosen as references to respectively define the protection scope of the present invention. Although different references cause differences in the eventual protection scope, it is indubitable that the two solutions are in fact derived from the same inventive concept.

As can further be seen from the formula $S=EI/D_m^3$, $S \propto 1/D_m^3$, that is, the stiffness S is inversely proportional to the third power of the medium diameter $D_m$. It can be seen that, if other conditions are kept unchanged, when the medium diameter of the backbone portion is smaller, the stiffness is higher. In addition, the increase in stiffness further grows geometrically with the decrease in the medium diameter. Therefore, it is an effective measure to decrease the diameter of the cage to improve the stiffness of the cage. The maximum outer diameter $D_{c\_max}$ of the cage is used to limit the medium diameter size $D_m$ of the cage below.

Similar to the preceding case, first, a pitch diameter $D_p$ of the bearing and the diameter $D_w$ of the rolling element are used as references to describe the scope that the present invention seeks to protect. The maximum outer diameter $D_{c\_max}$ of the cage in the present invention and the pitch diameter $D_p$ of the bearing satisfy the relation $-16.256\% \leq (D_{c\_max}-D_p)/D_w \leq 24.384\%$. The pitch diameter $D_p$ is defined as half of the sum of an outer diameter D and an inner diameter d of the bearing, that is, $D_p=(D+d)/2$. In a further preferred embodiment, the maximum outer diameter $D_{c\_max}$ of the cage and the pitch diameter $D_p$ of the bearing further satisfy the relation $-8.128\% \leq (D_{c\_max}-D_p)/Dw \leq 16.256\%$. In yet a further preferred embodiment, the maximum outer diameter $D_{c\_max}$ of the cage and the pitch diameter $D_p$ of the bearing satisfy the relation $-8.128\% \leq (D_{c\_max}-D_p)/D_w \leq 8.128\%$.

If the radial size H of the bearing is used as a reference, the maximum outer diameter $D_{c\_max}$ of the cage in the present invention and the pitch diameter $D_p$ of the bearing satisfy the relation $-5\% \leq (D_{c\_max}-D_p)/H \leq 7.5\%$. In a further preferred embodiment, the maximum outer diameter $D_{c\_max}$ of the cage and the pitch diameter $D_p$ of the bearing further satisfy the relation $-2.5\% \leq (D_{c\_max}-D_p)/H \leq 5\%$. In yet a further preferred embodiment, the maximum outer diameter $D_{c\_max}$ of the cage and the pitch diameter $D_p$ of the bearing satisfy the relation $-2.5\% \leq (D_{c\_max}-D_p)/H \leq 2.5\%$.

It can be easily understood that the preceding two limitation manners are consistent in the intention of limiting the maximum outer diameter $D_{c\_max}$ of the cage, except that the chosen comparison basis is the diameter $D_w$ of the rolling element and the radial size H of the bearing, respectively. Therefore, the two limitation manners are in fact two technical solutions derived from the same inventive concept.

In reality, the minimum inner diameter $D_{c\_min}$ of the cage is limited by the size of an inner ring of the bearing and cannot be reduced infinitely to improve the stiffness of the cage. In addition, the snap-in cage is guided by the rolling element of the bearing, and a pocket (a hanging out portion) of the cage should match the rolling element in radial height. The factors in the preceding two aspects restrict an inner diameter (the minimum value $D_{c\_min}$) of the cage from decreasing infinitely, and therefore, the inner diameter of the cage usually has a lower limit value. In view of the radial size of the cage $H_c=(D_{c\_max}-D_{c\_min})/2$, the limitation on the maximum outer diameter $D_{c\_max}$ of the cage in fact constitutes a limitation on the radial size $H_c$ of the cage in terms of thickness, thereby constituting a limitation on the mass of the cage. In this sense, the limitation on outer diameter size $D_{c\_max}$ of the cage and the limitation on the radial size $H_c$ of the cage in terms of thickness may be understood as two different embodiments of the same inventive concept.

As can further be seen from the foregoing deduction $S \propto t^3$, when the wall thickness of the backbone portion is increased, the stiffness of the backbone portion can be greatly improved. For the backbone portion of a single-layer structure, the wall thickness of the backbone portion larger than the conventional size, especially larger than the single-layer wall thickness of the prior art double-layer cage structure, is an important feature of the present invention that is different from the existing cages. However, an excessively thick and heavy backbone portion not only increases the mass of the cage but also makes the center of mass of the cage deviate towards one side of the backbone portion, and, as a result, the cage is likely to fall off from the rolling element during high-speed rotation. Therefore, the thickness of the backbone portion should be designed to be within a suitable interval instead of being excessively large or small.

Experiments show that it is appropriate if the ratio $H_b/D_w$ of the radial size $H_b$ of the backbone portion in terms of thickness to a radial size $D_w$ of the rolling element of the bearing preferably satisfies the relation $10.16\% \leq H_b/$ $D_w \le 28.448\%$. The radial size $H_b$ is defined as half of the difference between the maximum outer diameter $D_{b\_max}$ and the minimum inner diameter $D_{b\_min}$ of the backbone portion, that is, $H_b=(D_{b\_max}-D_{b\_min})/2$. The radial dimension $H_b$ in the above range, while achieving sufficient rigidity of the backbone portion, is also significantly smaller than that of the prior art two-layer structure backbone portion, which obviously contributes to the maximum attenuation of the umbrella effect of the cage. In a further preferred embodiment, the ratio $H_b/D_w$ of the radial size $H_b$ of the backbone portion in terms of thickness to the radial size $D_w$ of the rolling element of the bearing may further satisfy the relation $11.786\% \le H_b/D_w \le 24.384\%$. In yet a further preferred embodiment, the ratio $H_b/D_w$ of the radial size $H_b$ of the backbone portion in terms of thickness to the radial size $D_w$ of the rolling element of the bearing may satisfy the relation $13.411\% \le H_b/D_w \le 20.32\%$.

In another limitation manner, if the radial size H of the bearing in terms of thickness is used as a reference, in this case, the ratio $H_b/H$ of the radial size $H_b$ of the backbone portion in terms of thickness to the radial size H of the bearing should satisfy the relation $5\% \le H_b/H \le 15\%$. In a further preferred embodiment, the ratio $H_b/H$ of the radial size $H_b$ of the backbone portion to the radial size H of the bearing should further satisfy the relation $5.75\% \le H_b/H \le 12.5\%$. In yet a further preferred embodiment, the ratio $H_b/H$ of the radial size $H_b$ of the backbone portion to the radial size H of the bearing should satisfy the relation $6.25\% \le H_b/H \le 10\%$, so as to achieve an optimal technical effect.

Figure 1A:
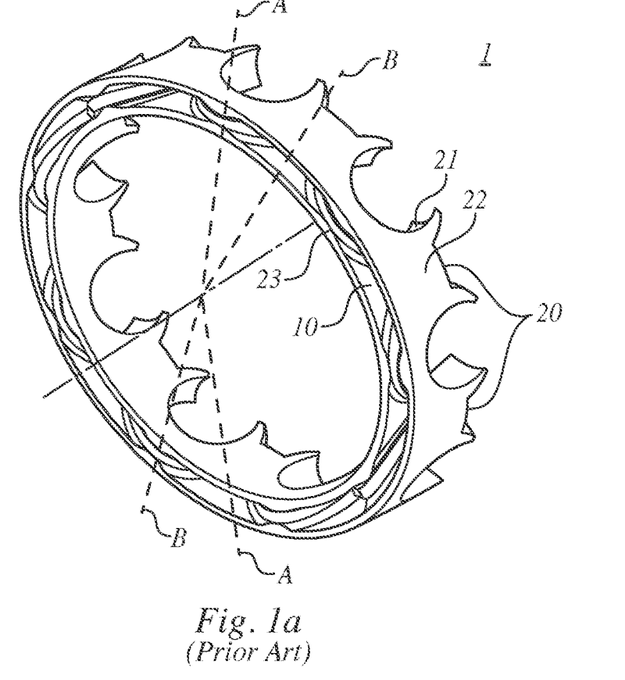
FIG. 1a is a perspective view of a double-layer cage in the prior art.
Figure 1B:
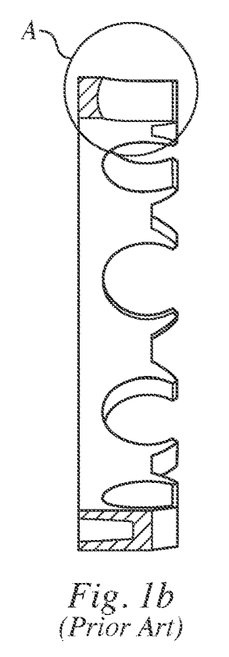
Figure 1C:
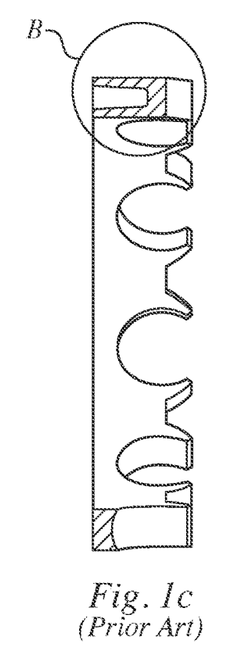
Figure 1D:
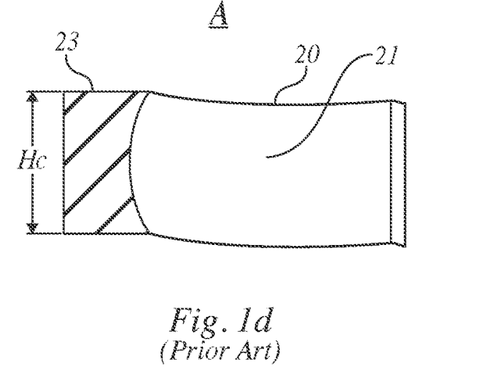
FIG. 1d is a partial enlarged view of an area A in FIG. 1b.
Figure 1E:
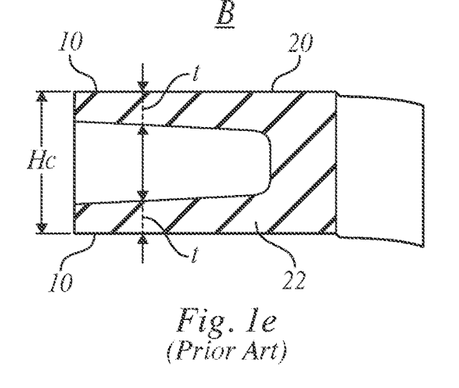
FIG. 1e is a partial enlarged view of an area B in FIG. 1c.
Figure 2A:
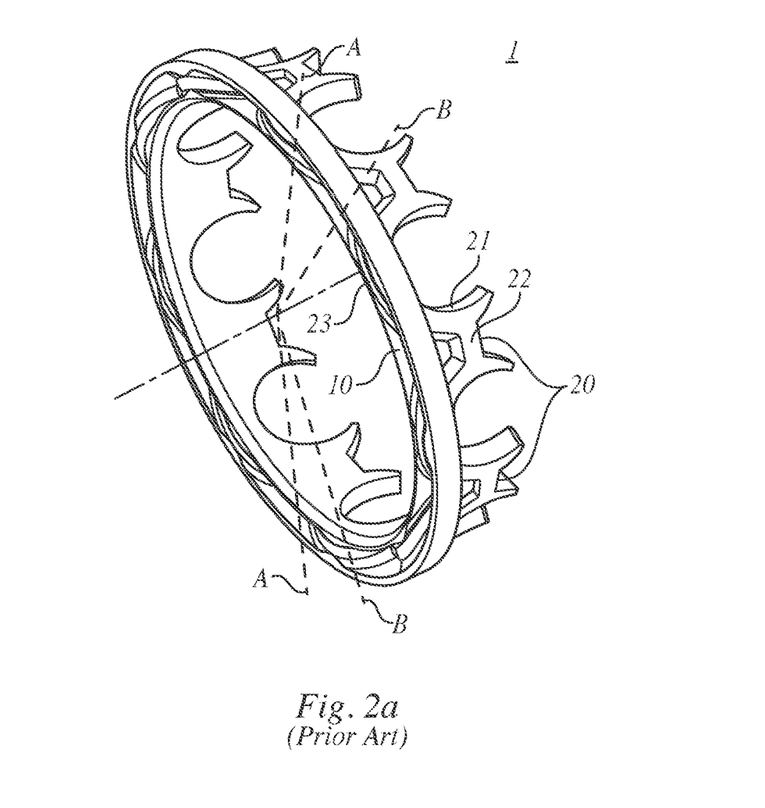
FIG. 2a is a perspective view of a cage using a double-layer backbone portion in the prior art.
Figure 2B:
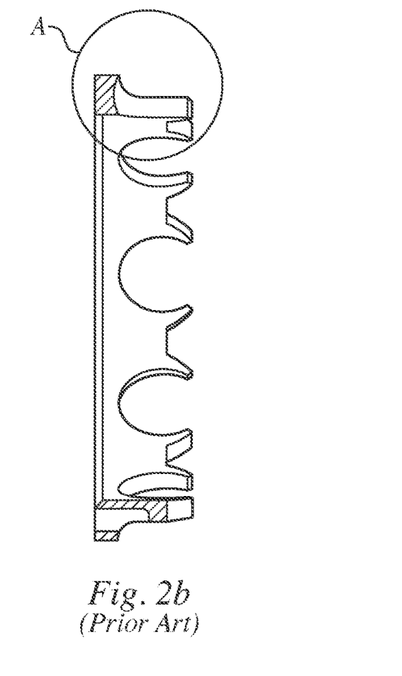
Figure 2C:
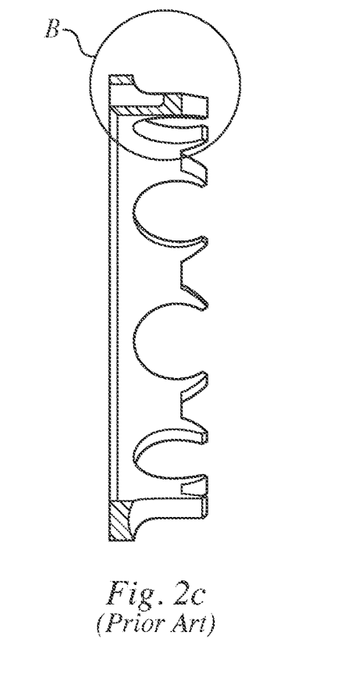
Figure 2D:
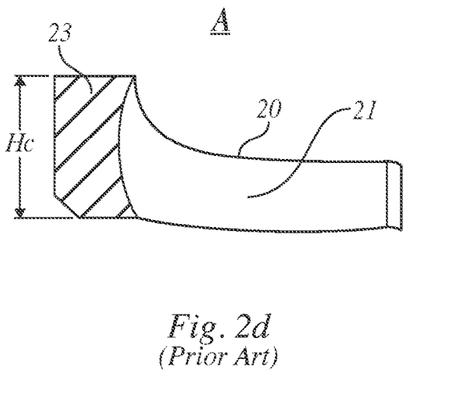
FIG. 2d is a partial enlarged view of an area A in FIG. 2b.
Figure 2E:
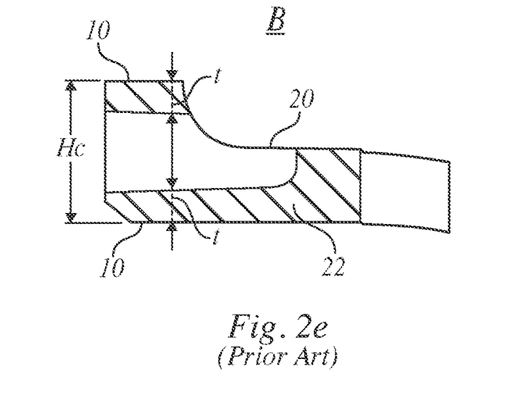
FIG. 2e is a partial enlarged view of an area B in FIG. 2c.
Figure 3A:
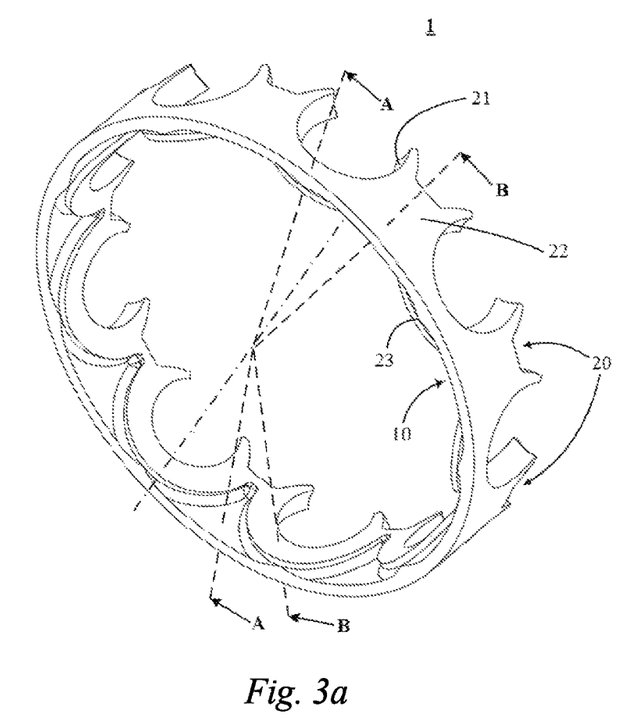
FIG. 3a is a perspective view of a cage according to a first embodiment of the present invention.
Figure 3B:
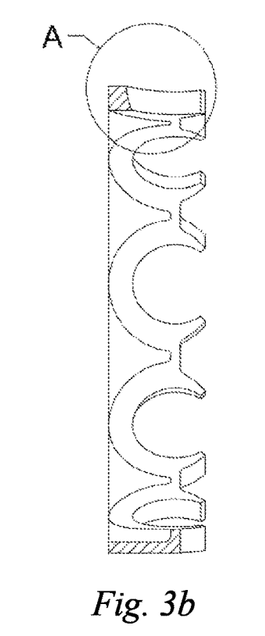
Figure 3C:
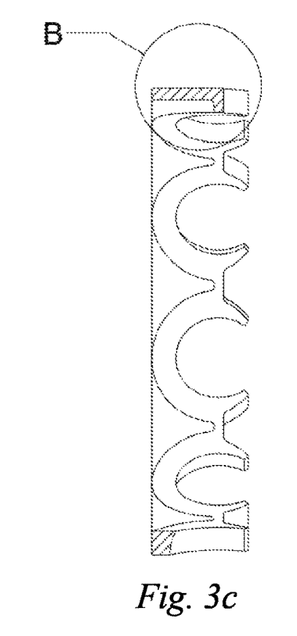
Figure 3D:
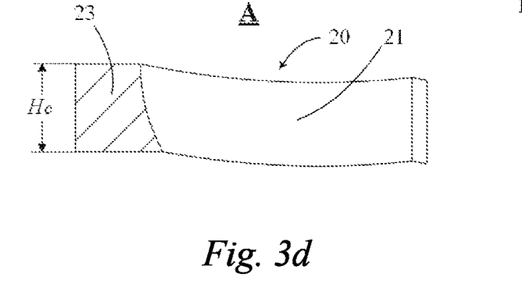
FIG. 3d is a partial enlarged view of an area A in FIG. 3b.
Figure 3E:
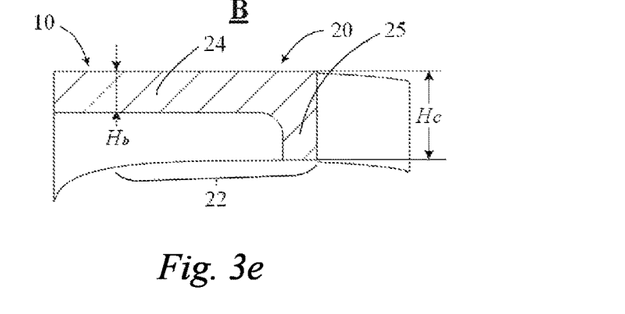
FIG. 3e is a partial enlarged view of an area B in FIG. 3c.
Figure 4A:
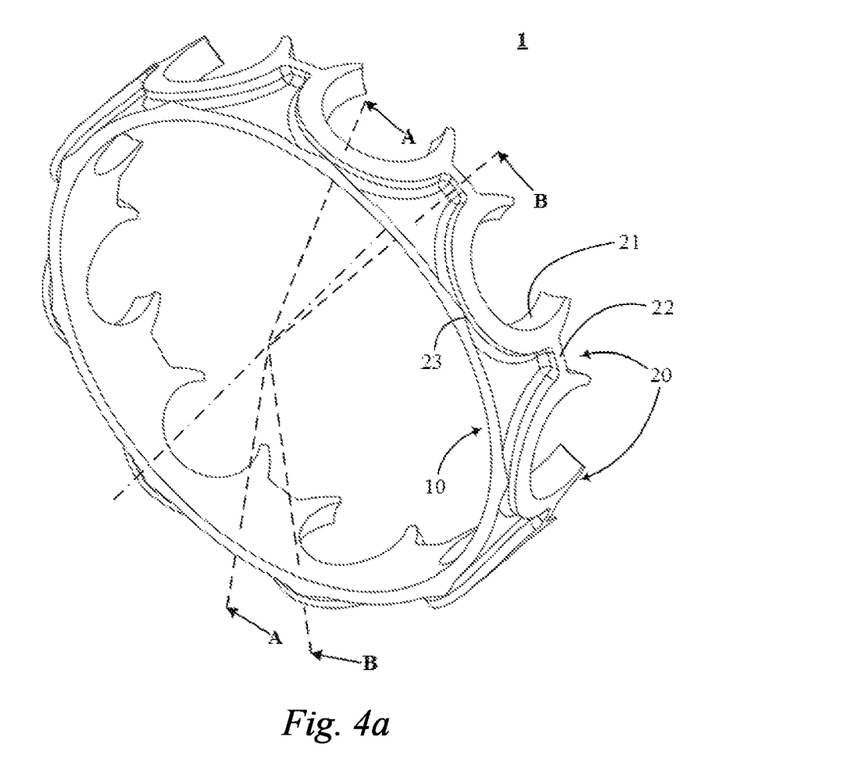
FIG. 4a is a perspective view of a cage according to a second embodiment of the present invention.
Figure 4B:
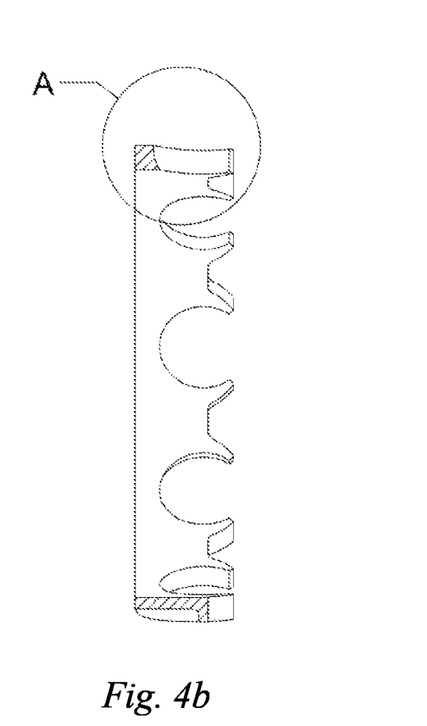
Figure 4C:
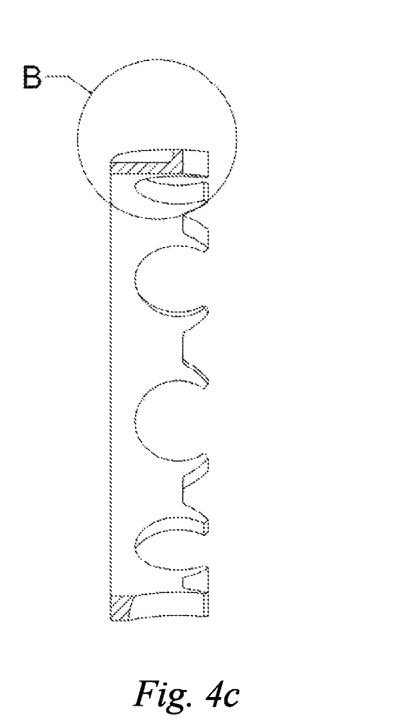
Figure 4D:
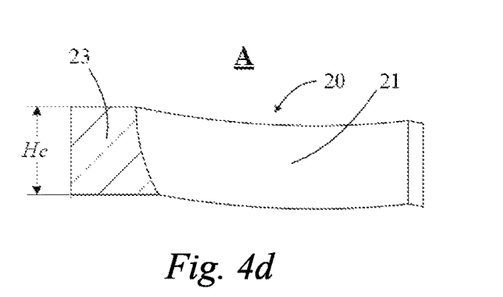
FIG. 4d is a partial enlarged view of an area A in FIG. 4b.
Figure 4E:
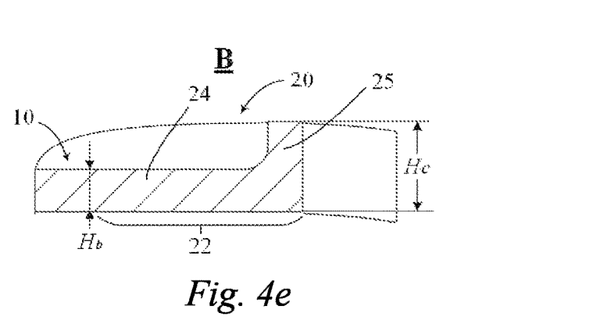
FIG. 4e is a partial enlarged view of an area B in FIG. 4c.
Figure 5A:
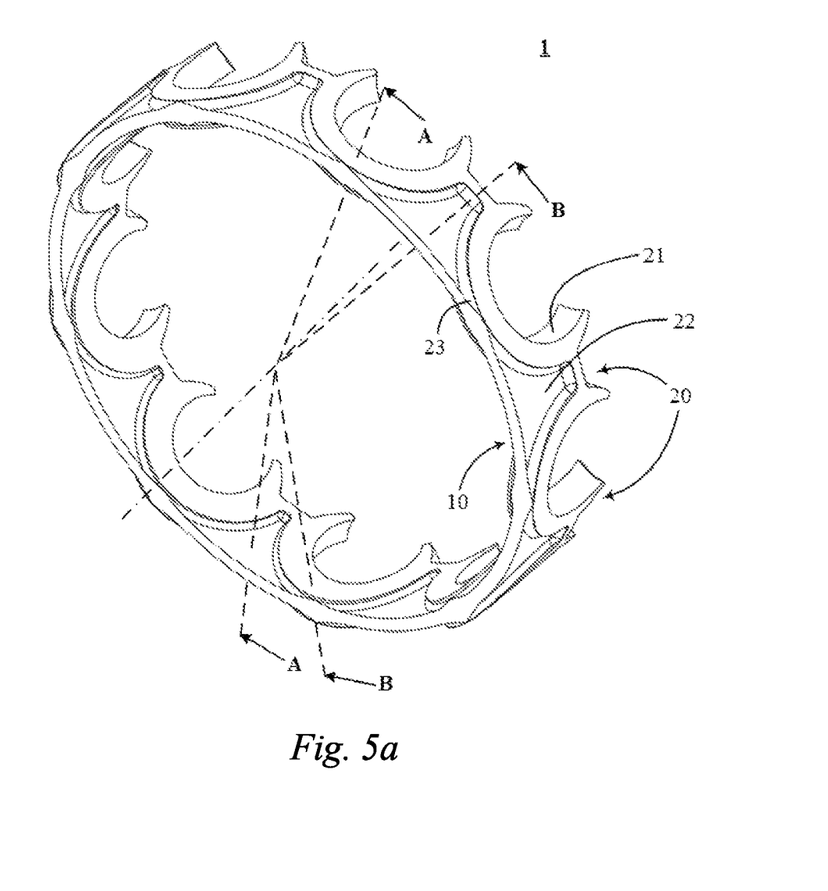
FIG. 5a is a perspective view of a cage according to a third embodiment of the present invention.
Figure 5B:
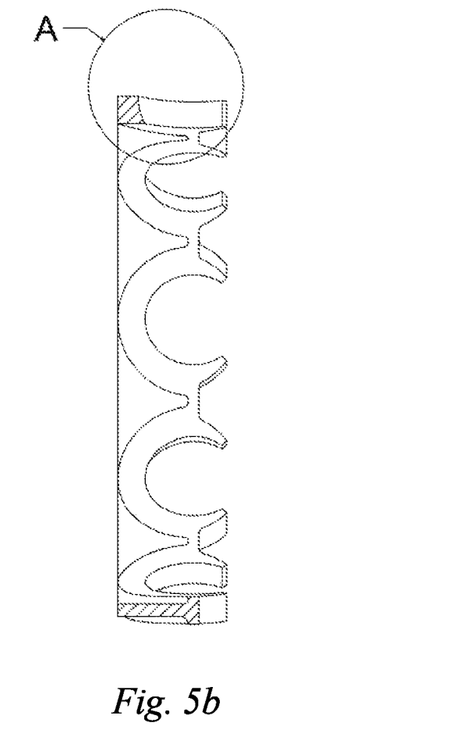
Figure 5C:
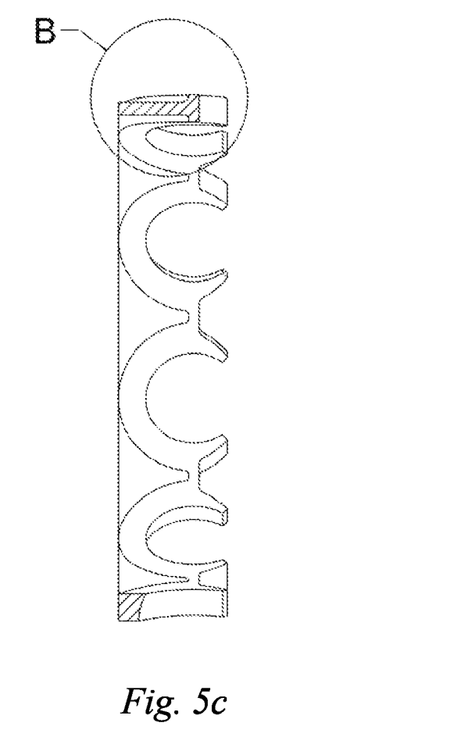
Figure 5D:
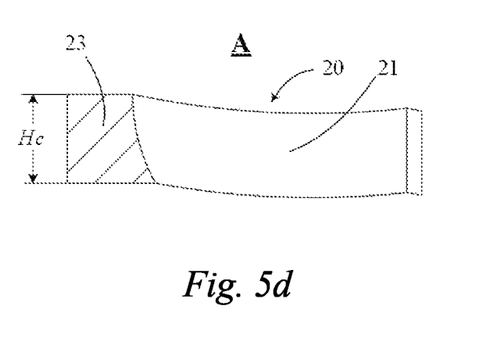
FIG. 5d is a partial enlarged view of an area A in FIG. 5b.
Figure 5E:
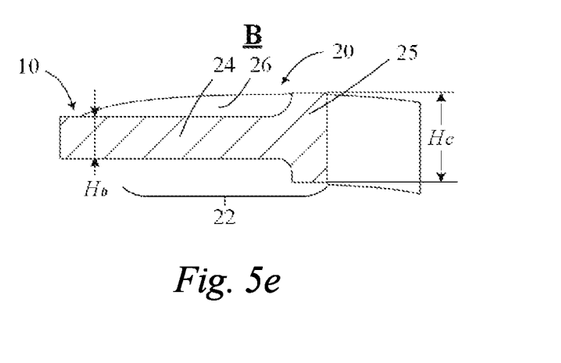
FIG. 5e is a partial enlarged view of an area B in FIG. 5c.

As can be seen from FIG. 3e, a pocket connection 22 comprises an axial rib 24 and a radial rib 25 extending inwards approximately perpendicularly from an axial free end of the axial rib 24. In one aspect, the axial rib and the radial rib form an L-shaped section to achieve a solid structure. In another aspect, the structural thickness (the material wall thickness $H_b$ in this embodiment) of the axial rib 24 is much less than the radial size ($H_c$ in this embodiment) of a pocket 21. Therefore, the overall mass of a hanging out portion 20 can be reduced, thereby minimizing the umbrella effect.

FIG. 4 shows a second embodiment of the present invention. As shown in FIG. 4e, the axial rib 24 and the radial rib 25 form an L-shaped section. However, the radial rib 25 extends outwards approximately in a radial direction from the axial free end of the axial rib 24. In the case where the cage outer diameter dimension $D_{c\_max}$ is kept the same, not only such pocket connection 22 has a smaller turning mass (mass of revolution) than the pocket connection in the first embodiment, thereby reducing the "burden" of the hanging out portion 20 that forms the umbrella effect, but also the diameter of the backbone portion 10 is smaller than that of the backbone portion in the first embodiment, which is more advantageous for increasing the rigidity of the base portion. It can be easily understood that the preceding two factors jointly help to further mitigate the umbrella effect.

FIG. 5 shows a third embodiment of the present invention. As shown in FIG. 5e, the axial rib 24 and the radial rib 25 form a T-shaped section. The radial rib 25 extends in a radial direction inwards and outwards from the axial free end of the axial rib 24. In terms of its mass of the revolution and rigidity, the cage of the T-section is between the first and second embodiments. However, the T-shaped symmetrical structure has better stability and resistance to deformation in joining the side walls 26 between adjacent pockets than the rib structure of the L-section.

FIG. 6 shows a fourth embodiment of the present invention. As shown in FIG. 6e, the axial rib 24 comprises a converging portion 24a, the diameter size of which is less than that of the backbone portion 10. In one aspect, in the case where the outer diameter size $D_{c\_max}$ of the cage is kept the same, the axial rib 24 having a converging portion 24a of a reduced diameter contributes to decreased mass of gyration of the pocket connection 22. In another aspect, the axial rib 24 in such a form has both an axial span and a radial span and can be connected to side walls 26 of the pocket 21 in two dimensions. Compared with the case of the T-shaped section or the L-shaped section in which the axial rib 24 is connected to the side wall 26 of the pocket in only one (axial) dimension, the pocket connection 22 formed between the axial rib and the pocket 21 is stiffer and more resistant to umbrella deformation.

Figure 6A:
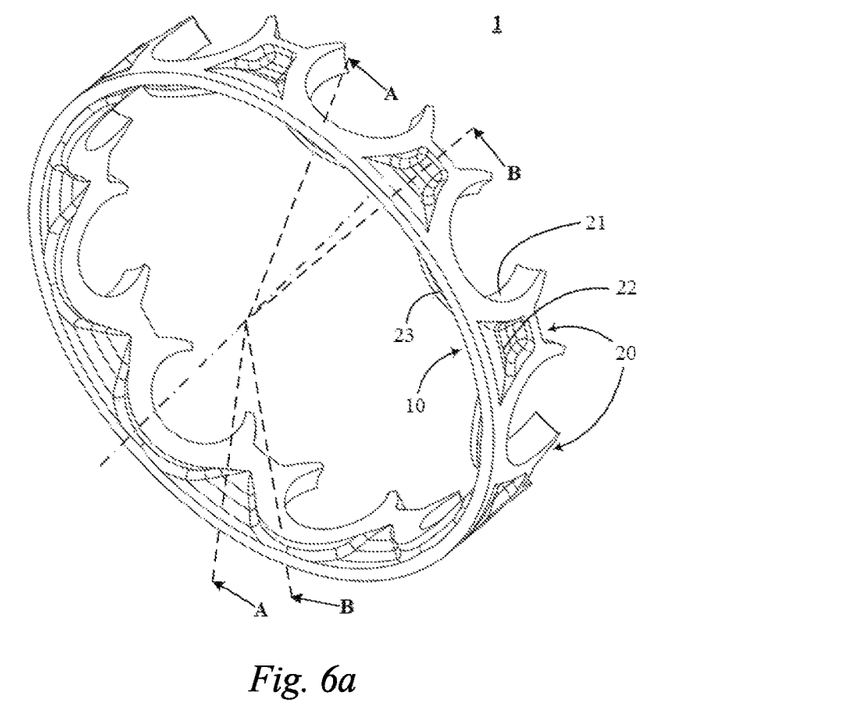
FIG. 6a is a perspective view of a cage according to a fourth embodiment of the present invention.
Figure 6B:
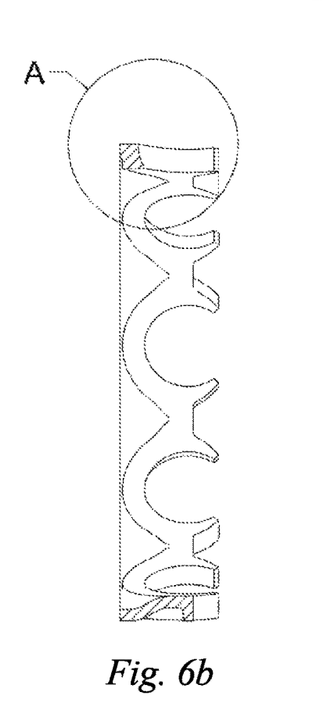
Figure 6C:
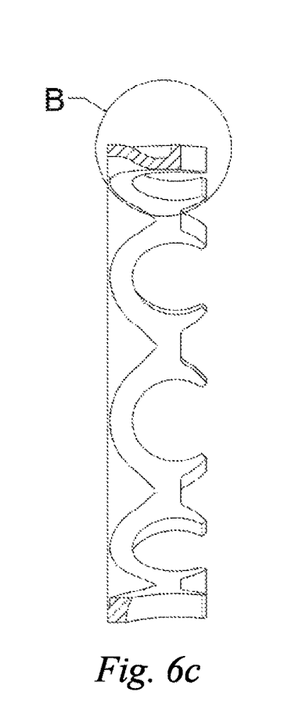
Figure 6D:
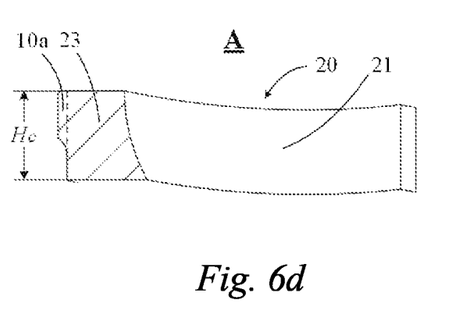
FIG. 6d is a partial enlarged view of an area A in FIG. 6b.
Figure 6E:
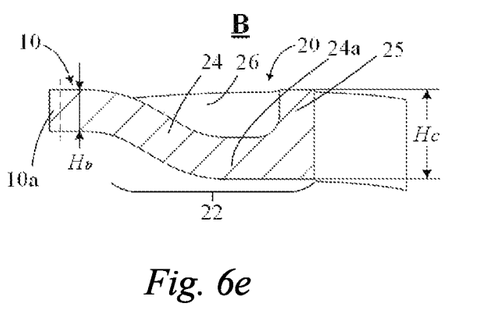
FIG. 6e is a partial enlarged view of an area B in FIG. 6c.

As can further be seen from the previous formulae $S=EI/D_m^3$ and $I=bt^3/12$, $S \propto b$, that is, the stiffness of an annular structure is directly proportional to the (axial) width of the annular structure. Therefore, when the backbone portion is wider, the stiffness of the backbone portion can be improved. As shown in FIG. 6e, the backbone portion 10 may be partially integrated in the material structure of the bottom portion 23 of the pocket 21, and a laterally protruding part 10a protrudes from the structure of the bottom portion 23 of the pocket 21. Apparently, when the backbone portion is wider, the laterally protruding part 10a is larger, and the stiffness is greater. However, a backbone portion that is excessively wide makes the center of mass of the cage deviate towards one side of the backbone portion, and the cage is likely to fall off from the rolling element during high-speed rotation. Therefore, instead of being as wide as possible, the width of the additional-width design (the protruding part 10a) of the backbone portion 10 should only be in a suitable range to help to improve the overall performance of the cage.

FIG. 7 shows a fifth embodiment of the present invention. In contrast to the fourth embodiment shown in FIG. 6, the axial rib 24 shown in FIG. 7e comprises an expanded portion 24b, the diameter size of which is obviously greater than that of the backbone portion 10. It can be easily understood that in the case where the outer diameter $D_{c\_max}$ of the cage is kept the same, the presence of the expanded portion 24b causes the cage 1 to have a backbone portion 10 of a relatively small diameter, which is advantageous in improving the rigidity of the backbone portion.

Figure 7A:
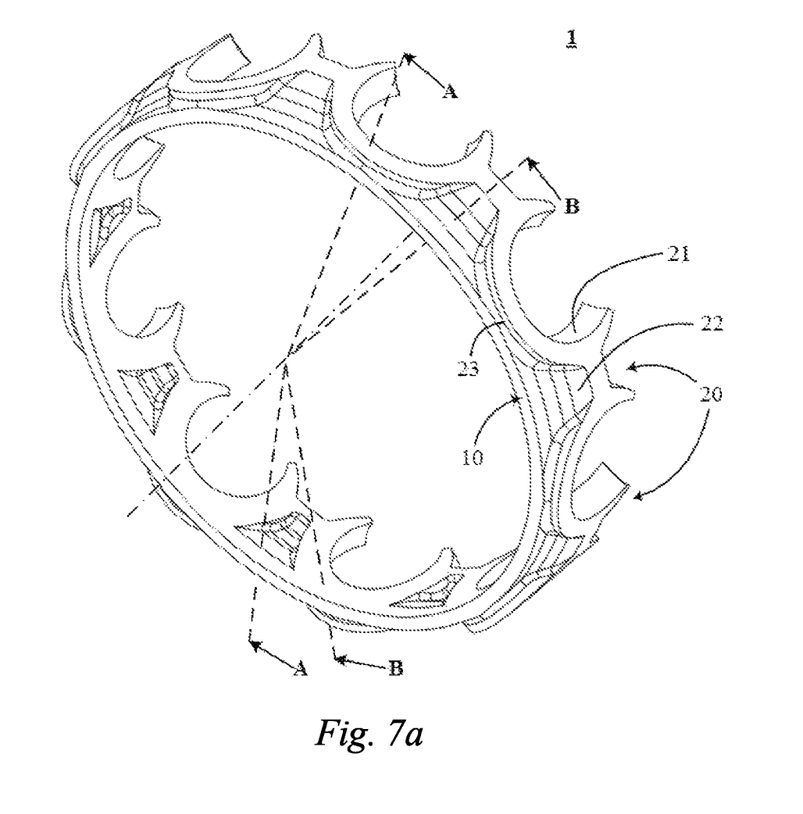
FIG. 7a is a perspective view of a cage according to a fifth embodiment of the present invention.
Figure 7B:
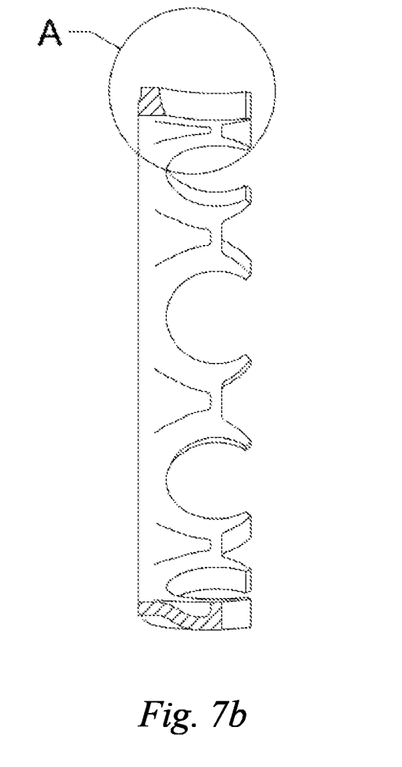
Figure 7C:
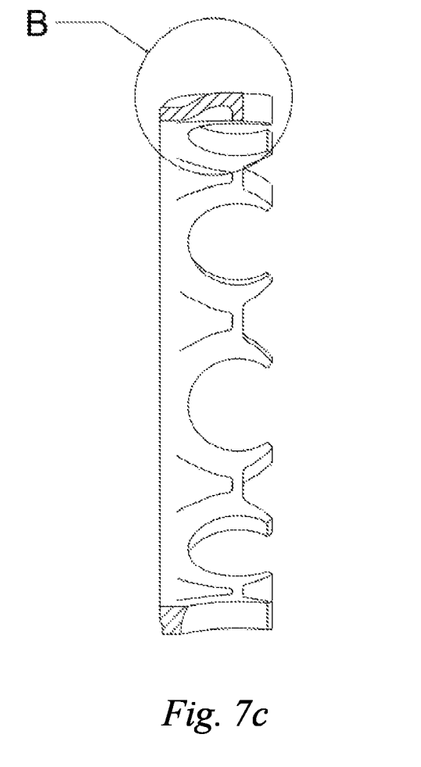
Figure 7D:
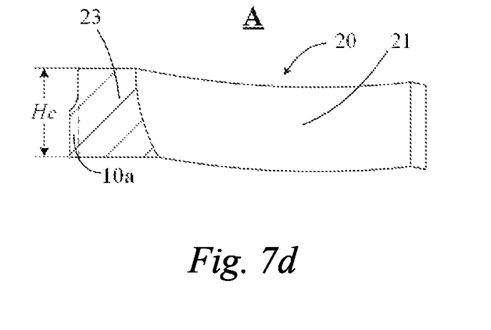
FIG. 7d is a partial enlarged view of an area A in FIG. 7b.
Figure 7E:
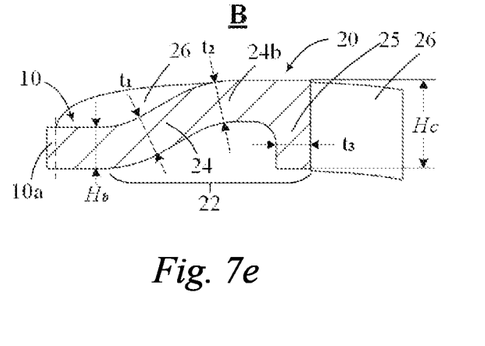
FIG. 7e is a partial enlarged view of an area B in FIG. 7c.

Optionally, for any of the preceding embodiments, the radial size $H_b$ of the backbone portion 10 is preferably greater than or equal to each of the thicknesses t1, t2, t3 of the axial rib 24 and the radial rib 25 at different positions, that is, $H_b \ge t_1$, $H_b \ge t_2$, and $H_b \ge t_3$, as shown in FIG. 7e. This means that the ratio of the stiffness of the backbone portion to the mass of gyration of the hanging out portion is further increased, in which case the umbrella effect of the cage can be minimized.

The various technical features of the present invention, including the size ranges disclosed above, are completely applicable to all deep groove ball bearings of the diameter series of 7, 8, 9, 0, 1, 2, 3, and 4 in the current international standard ISO 15. In practice, high speed bearings are generally not large in size and generally have an outer diameter of no more than 420 mm. The present invention is especially advantageous for application to deep groove ball bearings with a high rotational speed within this size range.

A person skilled in the art may easily understand that various technical features of the present invention that are described above may be implemented independently or used in combination without being limited by specific embodiments. Any variation or improvement made to the above cage and deep groove ball bearing using the cage falls within the protection scope of the present invention provided such variation or improvement conforms to the limitations in the appended claims.

What is claimed is:

1. A one-way snap-in cage for a deep groove ball bearing, comprising:
   an annular backbone portion, and
   a hanging out portion extending from the backbone portion towards an axial side, the hanging out portion comprising:
   a pocket for accommodating a rolling element of the bearing in a circumferential direction, and
   a pocket connection used to connect adjacent pockets,
   a bottom portion of the pocket being formed integrally with the backbone portion, and at other positions in the circumferential direction, the backbone portion extending in an axial direction to form the pocket connection, wherein
   the ratio $H_c/D_w$ of a radial size $H_c$ of the cage in terms of thickness to the diameter $D_w$ of the rolling element of the bearing satisfies the relation $17.679\% \leq H_c/D_w \leq 37.389\%$, and wherein
   the radial size $H_c$ of the cage is equal in value to half of the difference between the maximum outer diameter $D_{c\_max}$ and the minimum inner diameter $D_{c\_min}$ of the cage as follows in the equation:

$$H_c = (D_{c\_max} - D_{c\_min})/2.$$

2. The one-way snap-in cage according to claim 1, wherein the ratio $H_c/D_w$ of the radial size $H_c$ of the cage in terms of thickness to the diameter $D_w$ of the rolling element of the bearing further satisfies the relation $19.711\% \leq H_c/D_w \leq 33.325\%$.

3. The one-way snap-in cage according to claim 2, wherein the ratio $H_c/D_w$ of the radial size $H_c$ of the cage in terms of thickness to the diameter $D_w$ of the rolling element of the bearing yet further satisfies the relation $20.523\% \leq H_c/D_w \leq 31.293\%$.

4. The one-way snap-in cage according to claim 1, wherein the backbone portion uses a single-layer structure, the ratio $H_b/D_w$ of a radial size $H_b$ of the backbone portion in terms of thickness to the diameter $D_w$ of the rolling element of the bearing satisfies the relation $10.16\% \leq H_b/D_w \leq 28.448\%$, wherein
   the radial size $H_b$ of the backbone portion in terms of thickness is defined as half of the difference between the maximum outer diameter $D_{b\_max}$ and the minimum inner diameter $D_{b\_min}$ of the backbone portion, that is, $H_b = (D_{b\_max} - D_{b\_min})/2$.

5. The one-way snap-in cage according to claim 4, wherein the ratio $H_b/D_w$ of the radial size $H_b$ of the backbone portion in terms of thickness to the diameter $D_w$ of the rolling element of the bearing further satisfies the relation $11.786\% \leq H_b/D_w \leq 24.384\%$.

6. The one-way snap-in cage according to claim 5, wherein the ratio $H_b/D_w$ of the radial size $H_b$ of the backbone portion in terms of thickness to the diameter $D_w$ of the rolling element of the bearing yet further satisfies the relation $13.411\% \leq H_b/D_w \leq 20.32\%$.

7. The one-way snap-in cage according to claim 1, wherein the backbone portion uses a single-layer structure, the ratio $H_b/H$ of a radial size $H_b$ of the backbone portion in terms of thickness to a radial size $H$ of the bearing in terms of thickness satisfies the relation $5\% \leq H_b/H \leq 15\%$, wherein the radial size $H_b$ of the backbone portion is defined as half of the difference between the maximum outer diameter $D_{b\_max}$ and the minimum inner diameter $D_{b\_min}$ of the backbone portion, that is, $H_b = (D_{b\_max} - D_{b\_min})/2$; and a radial size $H$ of the bearing in terms of thickness is equal in value to half of the difference between an outer diameter $D$ and an inner diameter $d$ of the bearing, that is, $H = (D - d)/2$.

8. The one-way snap-in cage according to claim 7, wherein the ratio $H_b/H$ of the radial size $H_b$ of the backbone portion in terms of thickness to the radial size $H$ of the bearing in terms of thickness further satisfies the relation $5.75\% \leq H_b/H \leq 12.5\%$.

9. The one-way snap-in cage according to claim 8, wherein the ratio $H_b/H$ of the radial size $H_b$ of the backbone portion in terms of thickness to the radial size $H$ of the bearing in terms of thickness yet further satisfies the relation $6.25\% \leq H_b/H \leq 10\%$.

10. The one-way snap-in cage according to claim 1, wherein the backbone portion is partially integrated in the structure of the bottom portion of the pocket, and a laterally protruding part protrudes in an axial direction from the bottom portion of the pocket; or the backbone portion is completely integrated in the structure of the bottom portion of the pocket, and there is no laterally protruding part protruding in an axial direction from the bottom portion of the pocket.

11. The one-way snap-in cage according to claim 1, wherein the pocket connection comprises a radial rib formed on a side of an axial free end of the hanging out portion and an axial rib formed between the backbone portion and the radial rib, wherein
    the axial rib comprises a converging portion, the diameter of which is less than that of the backbone portion, and a tail end of the converging portion extends outwards to form the radial rib; or the axial rib comprises a flaring portion, the diameter of which is greater than that of the backbone portion, and a tail end of the flaring portion converges inwards to form the radial rib.

12. A deep groove ball bearing, comprising:
    an inner ring,
    an outer ring, and
    at least one row of rolling elements disposed between the inner ring and the outer ring, wherein
    the one-way snap-in cage according to claim 1 is disposed on the at least one row of rolling elements.

13. A one-way snap-in cage for a deep groove ball bearing, comprising:
    an annular backbone portion, and
    a hanging out portion extending from the backbone portion towards an axial side, the hanging out portion comprising a pocket for accommodating a rolling element of the bearing in a circumferential direction and a pocket connection used to connect adjacent pockets,
    a bottom portion of the pocket being formed integrally with the backbone portion, and, at other positions in the circumferential direction, the backbone portion extending in an axial direction to form the pocket connection, wherein
    the ratio $H_c/H$ of a radial size $H_c$ of the cage in terms of thickness to a radial size $H$ of the bearing in terms of thickness satisfies the relation $10.875\% \leq H_c/H \leq 23\%$, wherein
    the radial size $H_c$ of the cage in terms of thickness is equal in value to half of the difference between the maximum outer diameter $D_{c\_max}$ and the minimum inner diameter $D_{c\_min}$ of the cage, that is, $H_c = (D_{c\_max} - D_{c\_min})/2$; and a radial size H of the bearing in terms of thickness is equal in value to half of the difference between an outer diameter D and an inner diameter d of the bearing, that is, $H=(D-d)/2$.

14. The one-way snap-in cage according to claim 13, wherein the ratio $H_c/H$ of the radial size $H_c$ of the cage in terms of thickness to the radial size H of the bearing in terms of thickness further satisfies the relation $12.25\% \le H_c/H \le 20.5\%$.

15. The one-way snap-in cage according to claim 14, characterized in that: the ratio $H_c/H$ of the radial size $H_c$ of the cage in terms of thickness to the radial size H of the bearing in terms of thickness yet further satisfies the relation $16.125\% \le H_c/H \le 19.125\%$.

16. A one-way snap-in cage for a deep groove ball bearing, comprising:
    an annular backbone portion, and
    a hanging out portion extending from the backbone portion towards an axial side, the hanging out portion comprising a pocket for accommodating a rolling element of the bearing in a circumferential direction and a pocket connection used to connect adjacent pockets,
    a bottom portion of the pocket being formed integrally with the backbone portion and, at other positions in the circumferential direction, the backbone portion extending in an axial direction to form the pocket connection, wherein
    the maximum outer diameter $D_{c\_max}$ of the cage and a pitch diameter $D_p$ of the bearing satisfy the relation $-16.256\% \le (D_{c\_max} - D_p)/D_w \le 24.384\%$, wherein
    the pitch diameter $D_p$ of the bearing is defined as half of the sum of an outer diameter D and an inner diameter d of the bearing, that is, $D_p = (D+d)/2$; and $D_w$ is the diameter of the rolling element of the bearing.

17. The one-way snap-in cage according to claim 16, wherein the maximum outer diameter $D_{c\_max}$ of the cage and the pitch diameter $D_p$ of the bearing further satisfy the relation $-8.128\% \le (D_{c\_max} - D_p)/D_w \le 16.256\%$.

18. A one-way snap-in cage according to claim 17, wherein the maximum outer diameter $D_{c\_max}$ of the cage and the pitch diameter $D_p$ of the bearing yet further satisfy the relation $-8.128\% \le (D_{c\_max} - D_p)/D_w \le 8.128\%$.

19. A one-way snap-in cage for a deep groove ball bearing, comprising:
    an annular backbone portion, and
    a hanging out portion extending from the backbone portion towards an axial side, the hanging out portion comprising:
        a pocket for accommodating a rolling element of the bearing in a circumferential direction, and
        a pocket connection used to connect adjacent pockets,
        a bottom portion of the pocket being formed integrally with the backbone portion, the backbone portion extending in an axial direction to form the pocket connection, wherein
    the maximum outer diameter $D_{c\_max}$ of the cage and a pitch diameter $D_p$ of the bearing satisfy the relation $-5\% \le (D_{c\_max} - D_p)/H \le 7.5\%$, wherein
    the pitch diameter $D_p$ of the bearing is defined as half of the sum of an outer diameter D and an inner diameter d of the bearing, that is, $D_p = (D+d)/2$; and
    a radial size H of the bearing in terms of thickness is defined as half of the difference between the outer diameter D and the inner diameter d of the bearing, that is, $H = (D-d)/2$.

20. The one-way snap-in cage according to claim 19, wherein the maximum outer diameter $D_{c\_max}$ of the cage and the pitch diameter $D_p$ of the bearing further satisfy the relation $-2.5\% \le (D_{c\_max} - D_p)/H \le 5\%$.

21. A one-way snap-in cage according to claim 20, wherein the maximum outer diameter $D_{c\_max}$ of the cage and the pitch diameter $D_p$ of the bearing yet further satisfy the relation $-2.5\% \le (D_{c\_max} - D_p)/H \le 2.5\%$.

* * * * *